I. KITSEE.
PROTECTING KINEMATOGRAPHIC FILMS.
APPLICATION FILED OCT. 28, 1909.

1,042,801.

Patented Oct. 29, 1912.

WITNESSES:

INVENTOR.

UNITED STATES PATENT OFFICE.

ISIDOR KITSEE, OF PHILADELPHIA, PENNSYLVANIA.

PROTECTING KINEMATOGRAPHIC FILMS.

1,042,801.　　　　　Specification of Letters Patent.　　Patented Oct. 29, 1912.

Application filed October 28, 1909. Serial No. 525,057.

*To all whom it may concern:*

Be it known that I, ISIDOR KITSEE, a citizen of the United States, residing at Philadelphia, in the county of Philadelphia and State of Pennsylvania, have invented certain new and useful Improvements in Protecting Kinematographic Films, of which the following is a specification.

My invention relates to an improvement in protecting kinematographic films.

The films on which the pictures for kinematographic exhibition are photographed or printed consist of a celluloid, the product of a nitrated fiber intermixed with a camphor.

The frequent occurrence of explosions of stored films is not due to a direct contact of a spark with the film proper, but is due to an elevation of the temperature of the inclosed air, surcharged with the gaseous products of the composition from the film. These products generally carry a nitrous compound with them, and these gaseous products elevate the temperature of the inclosed air.

It is the aim of my invention to prevent such destructive explosions.

I have found that if a nitrated material is embedded in a carbonate compound, the gases given off by said material are neutralized, the temperature remains stationary and no deterioration is ascertainable. When two films, each inclosed in a receptacle, are subjected to a higher temperature; one film embedded in a carbonate, the other film minus said carbonate, then the film without the carbonate will inflame at a far lower temperature than the film embedded in the carbonate, for the reason that the gaseous products of the film embedded in the carbonate are neutralized as soon as they are given off, whereas the gaseous products of the other film tend to raise the temperature and explode. To protect, therefore, a film used for kinematographic exhibition, it is only necessary to embed the same in a carbonate or ammonium compound, such for instance as a bi-carbonate of ammonium, sodium, etc.

I preferably provide for the film a container and place the carbonate in said container; and for an illustration of one of the forms my invention may take, I have reference to the accompanying drawing, in which—

Figure 1:
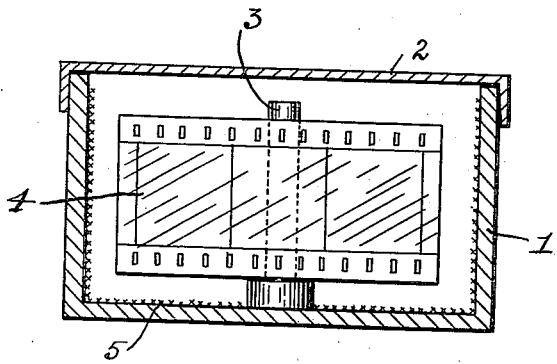
Figure 2:
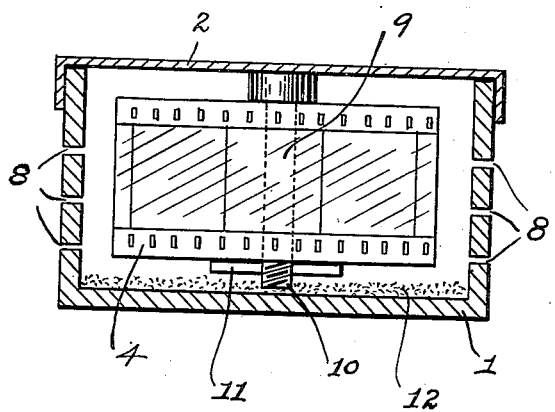

Figure 1 is a side elevation partially in section of a container; a film inclosed therein; the container lined with a carbonate, such for instance as bi-carbonate of soda; and in which Fig. 2 is a side elevation partially in section of a container in modified form.

In Fig. 1; 1 is the container; 2 the cover for same; 3 an upright or support; 4 the film placed on said support in a manner so as not to come in contact with the walls of the container proper; 5 the lining impregnated with a carbonate. This lining may consist of any suitable material, but it is preferred that the same shall consist of an asbestos. The container and its cover may consist of a metal, such as sheet iron.

In Fig. 2; 1 is the container provided with the perforations 8 and the cover 2. This cover is provided with means to place thereon the film 4. These means are here shown as the rod 9 provided with the screw threaded part 10 and the nut 11. The carbonate 12 is placed on the bottom of the container.

It is obvious that the form of the container may differ, but I have found that it is best to provide the container with means to hold the film away from the walls or cover. It is also obvious that instead of being placed in a container, the film may simply be wrapped in paper or textile fabric impregnated with a carbonate and I have only illustrated the container, for the reason that I believe the same to be more practical than a simple wrapping.

I am also aware that instead of placing each film in a separate container provided with a carbonate, the closed space in which a series of films are deposited or stored, may be provided with this carbonate compound— preferably bi-carbonate of soda—at suitable places.

The proximity of a bi-carbonate of ammonium has also this advantage that if a fire should break out in a place where such films are stored, the heat will release of the carbonate compound gases adapted to neutralize the gases given off from the burning film and, therefore, explosions will be prevented.

Having now described my invention, what

I claim as new and desire to secure by Letters Patent is:—

1. A container for the storage of moving picture and like films lined with an agent for neutralizing gases given off by the film stored therein.

2. A container for the storage of moving picture and like films having a lining impregnated with a neutralizing agent for the gases given off by the film stored therein.

3. A container for the storage of moving picture and like films having a lining impregnated with a carbonate of ammonium for neutralizing the gases given off by the film stored within the container.

4. In a container for the storage of moving picture and like films, the combination with the body thereof provided with an agent for neutralizing the gases given off by the film stored therein, of a support associated with the container to maintain the film in proximity to said neutralizing agent, but free from contact therewith.

5. In a container for the storage of moving picture and like films, the combination with the body thereof lined with an agent for neutralizing the gases given off by the film stored therein, of a support associated with the container to maintain the film in proximity to said neutralizing agent, but free from contact therewith.

In testimony whereof I affix my signature in presence of two witnesses.

ISIDOR KITSEE.

Witnesses:
EDITH R. SHILLEY,
ALVAH RITTENHOUSE.